United States Patent [19]

Wiklund

[11] Patent Number: 5,229,828
[45] Date of Patent: Jul. 20, 1993

[54] ARRANGEMENT FOR ESTABLISHING OR DEFINING THE POSITION OF A MEASURING POINT

[75] Inventor: Rudolf Wiklund, Täby, Sweden
[73] Assignee: Geotronics AB, Danderyd, Sweden
[21] Appl. No.: 768,299
[22] PCT Filed: Apr. 6, 1990
[86] PCT No.: PCT/SE90/00232
    § 371 Date: Oct. 7, 1991
    § 102(e) Date: Oct. 7, 1991
[87] PCT Pub. No.: WO90/12282
    PCT Pub. Date: Oct. 18, 1990

[30] Foreign Application Priority Data
Apr. 6, 1989 [SE] Sweden ................. 8901218
Apr. 6, 1989 [SE] Sweden ................. 8901219

[51] Int. Cl.⁵ .................................. G01C 3/08
[52] U.S. Cl. .................................. 356/4; 356/152
[58] Field of Search ............... 356/3, 4, 11, 152, 375

[56] References Cited
U.S. PATENT DOCUMENTS

| | | |
|---|---|---|
| 4,136,955 | 1/1979 | Aeschlimann et al. |
| 4,441,812 | 4/1984 | Feist . |
| 4,490,919 | 1/1985 | Feist et al. ............... 356/4 X |
| 4,494,870 | 1/1985 | Hertschel et al. ........... 356/152 |
| 4,688,937 | 8/1987 | König et al. ............... 356/5 |
| 4,712,915 | 12/1987 | Kosakowski et al. . |
| 4,717,251 | 1/1989 | Wells et al. ............... 356/4 |
| 4,830,489 | 5/1989 | Cain et al. ............... 356/152 X |
| 4,923,303 | 5/1990 | Lutz ....................... 356/152 X |
| 4,939,678 | 7/1990 | Beckwith, Jr. ............. 364/571.02 |
| 5,055,666 | 10/1991 | Miyahara ................. 356/152 X |

FOREIGN PATENT DOCUMENTS
2515336 10/1981 France .

OTHER PUBLICATIONS
"Measuring method of groups of points constituting inner and outer walls of structure"-vol. 10 No. 180 (P-471).

Primary Examiner—Mark Hellner
Attorney, Agent, or Firm—Pollock, Vande Sande & Priddy

[57] ABSTRACT

An arrangement is disclosed for establishing or defining measuring points which cannot be defined or established directly by a main station comprising distance measuring equipment which is operative to determine its own position and also the position of a position determining unit.

15 Claims, 6 Drawing Sheets

ARRANGEMENT FOR ESTABLISHING OR DEFINING THE POSITION OF A MEASURING POINT

FIELD OF THE INVENTION

The present invention relates to an arrangement for establishing or defining the position of a measuring point.

BACKGROUND OF THE INVENTION

A positioning system for establishing or defining the exact position of a measuring point on a surface will normally include a main station which comprises a distance meter, preferably an optical distance meter, which transmits and receives a measuring light beam in essentially the same direction, for instance an electronic distance meter (EDM) which functions to transmit and receive reflected modulated light and to make comparisons between the modulation signal of the transmitted and the received light beam, respectively. The system will also include a so-called vertical angle meter and a horizontal angle meter which function to determine the position of alignment of the distance meter with the object to be measured. The main station is set-up in the terrain and measurements are taken against setting-out staffs. The main station can either be manned by a single person or may be of the kind which locks automatically onto a prism on a setting-out staff and follows the prism as the staff is moved by the staffman. The use of a close-range measuring system for linking such a positioning system to a total principal measuring system, for instance a coordinate system, can be both effective and cost saving. By close-range measuring system is meant in the present context a system which obtains data for the starting position in an external main network and from there measures-up local points that are linked with the external network.

Situations also arise in which one and the same measuring equipment cannot be used for measuring a total area, but must be complemented with measurements taken with other equipment. When marking out an area, e.g. a plot of land, a road or highway etc., it is normal practice to place a distance meter in a central position. Setting-out staffs or sticks are then placed in position at mutually different measuring points in the terrain, by direct measurement between the centrally placed measuring instrument at each relevant measuring point. Occasionally some of the measuring points will be concealed from view with respect to the position of the distance measuring instrument, which then involves extra work in moving the instrument and also in making additional reference measurements for the purpose of determining the exact position of these points. This is particularly troublesome in the case of measuring equipment which can be handled by a single person and the use of which equipment is thus expanded upon. In the case of equipment of this nature, the centrally positioned distance measuring instrument will align automatically on the measuring point concerned or on the prism located on the staff that has been set-out. Naturally, movement of the instrument should be avoided if at all possible.

The use of such a close-range measuring system in cooperation with a main station is also particularly advantageous for determining the external measurements of a large object, for instance a car body.

SUMMARY OF THE INVENTION

The object of the present invention is to provide a close-range measuring system which can cooperate with a main measuring system.

BRIEF DESCRIPTION OF THE DRAWINGS

The invention will now be described in more detail with reference to the accompanying drawings, in which.

DESCRIPTION OF PREFERRED EMBODIMENTS

Figure 1A:
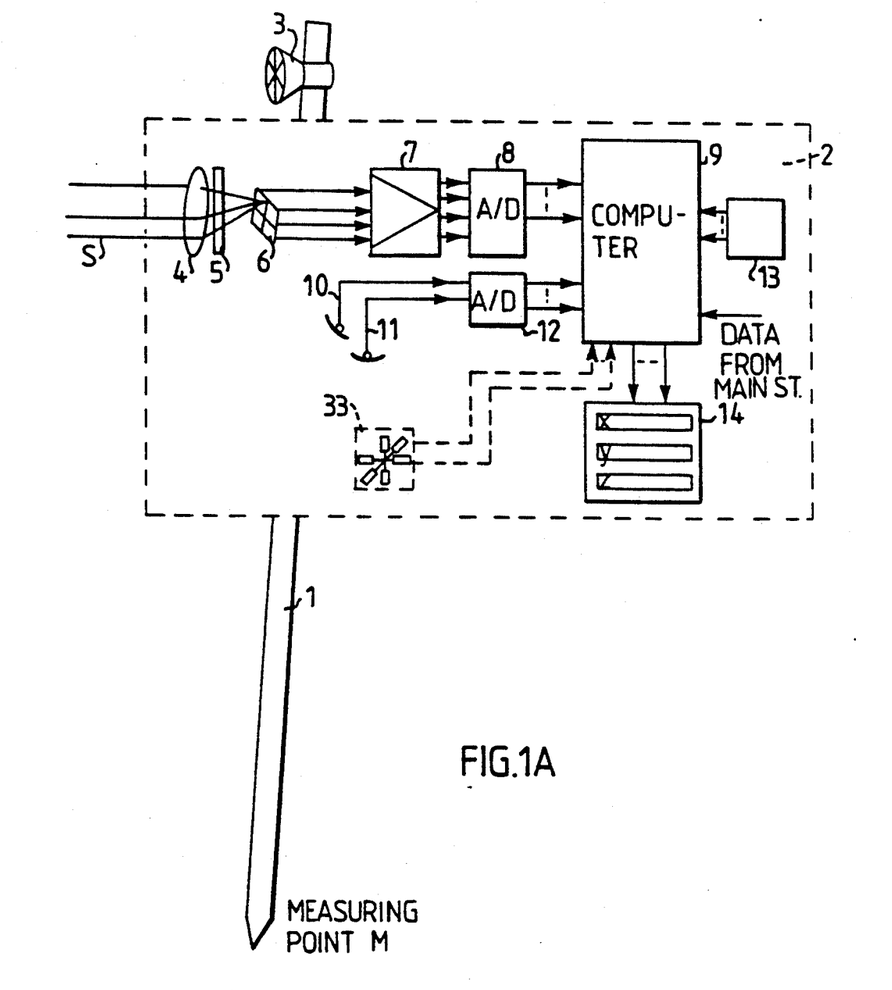
FIG. 1A illustrates a first embodiment of an arrangement constructed in accordance with the invention.
Figure 1B:
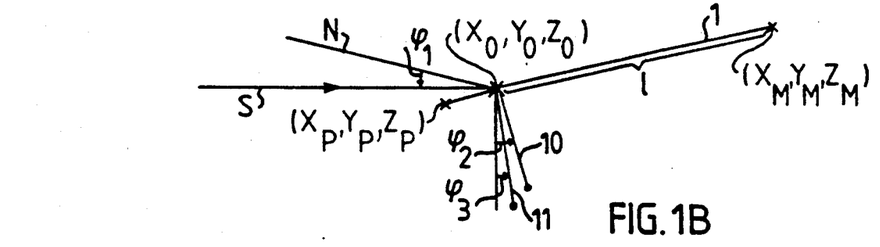
FIG. 1B is a vector diagram by means of which the arrangement in FIG. 1A can be made ready.

FIG. 1A illustrates a staff 1 provided with a unit 2, which is illustrated schematically within a broken-line frame and in a much larger size than its true size in practice. The staff 1 also has mounted thereon an alignment device 3, which in the illustrated embodiment has the form of a cube corner prism, onto which a main station (not shown) is aligned. The main measuring station is provided with distance measuring equipment, including a distance meter and a vertical and horizontal angle meter which function to measure the alignment direction of the distance meter. The main measuring station measures or determines the position $(X_p, Y_p, Z_p)$ of the cube corner prism 3 (FIG. 1B). The main measuring station is preferably of the kind which locks automatically onto a target and then follows the target as it moves. Since such a station has no connection with the present inventive concept, the structural design of the station will not be described here. Neither will the devices optionally mounted on the staff to assist alignment of the main measuring station with the target and tracking of the target be described in the present document. A target tracking arrangement, however, is described and illustrated in the coterminous Swedish Patent Application No. 8901220-7.

A practically collimated light beam S transmitted from the main measuring station impinges on an optical unit comprising a lens unit 4 and a filter 5. The lens system functions to filter-off background light, by filtering away all wavelengths except a narrow wavelength region around the wavelength of the incident light beam. The optical unit system is operative to focus the light onto a detector unit 6 having an extensive area on which the impingement point of an incident light beam can be indicated. The detector unit 6 may include several detectors or, for instance, may have the form of a quadrant detector or a so-called SITEC-detector. The signals generated by the detector unit 6 and indicating the point at which the light impinges thereon are sent to an amplifier 7 and from there to an analogue-digital-converter 8, which sends to a computer 9 a digital signal indicating said impingement point. On the basis of the established impingement point, the computer 9 computes the angular deviation $\phi_1$ (see FIG. 1B) between the normal N to the staff and the almost collimated light beam S from the main measuring station.

Two vertical-angle meters 10 and 11 measure the vertical angle in two mutually orthogonal directions. The vertical-angle indicators will preferably comprise two pendulum accelerometers or a double-pendulum accelerometer. The respective vertical-angle indicators 10 and 11 provide information relating to deviations $\phi_2$ and $\phi_3$ of the staff 2 from the vertical (FIG. 1B). The output signals of the vertical angle indicators are analogue/digital converted in an analogue/digital converter 12 and sent to the computer 9.

The measuring result obtained in the main measuring station is also sent to the computer 9. This transmission of data can be effected in various ways, for instance through cables or through radio links, modulation of transmitted optical light beams or some corresponding manner. It is also possible to store all data separately in the staff and in the main measuring station on each measuring occasion and, at a later stage, to transfer data from the main measuring station to the computer 9, or to transfer data from both the main station and the staff to some other computer assigned to carry out the computations and calculations. The distance l from a point for $X_0$, $Y_0$, $Z_0$, which is the junction point where the responsive planes of the angle-deviation measuring arrangement 4-8 and the vertical-angle indicator arrangement 10,11 form angles with one another is known, as is also the distance from the point $(X_p, Y_p, Z_p)$ for the prism 3 and the junction point $(X_O, Y_O, Z_O)$ and are fed into a memory in the computer 9. The computer 9 calculates the position of the measuring point M, by carrying out geometric calculations on the basis of the measured prism position, the direction of the beam S, which preferably coincides with the direction of alignment of the main-station distance meter, the three angles $\phi_1$, $\phi_2$, $\phi_3$ and the given distance zones on the staff. The result can be shown on a display unit 14.

The measuring process is effected by directionally positioning the staff 1, which may optionally be extensible so as to enable the staff to be adjusted to measurable lengths, placing the staff on the measuring point and then bringing the prism and the lens system into principal alignment with the main measuring station. The prism and lens system may be angled to the staff, so that they can be used more readily, and may also be mounted in a manner which will enable the prism and lens system to be adjusted to selected angular positions, wherewith information relating to the position to which the prism and lens system are adjusted is supplied to the computer 9, which is preferably a microprocessor.

Instead of the distance l to the measuring point being given by part of a staff, this distance may, instead, be given by a distance meter which is stationarily positioned in alignment with the line whose slope is detected by the two vertical angle meters.

Figure 2:
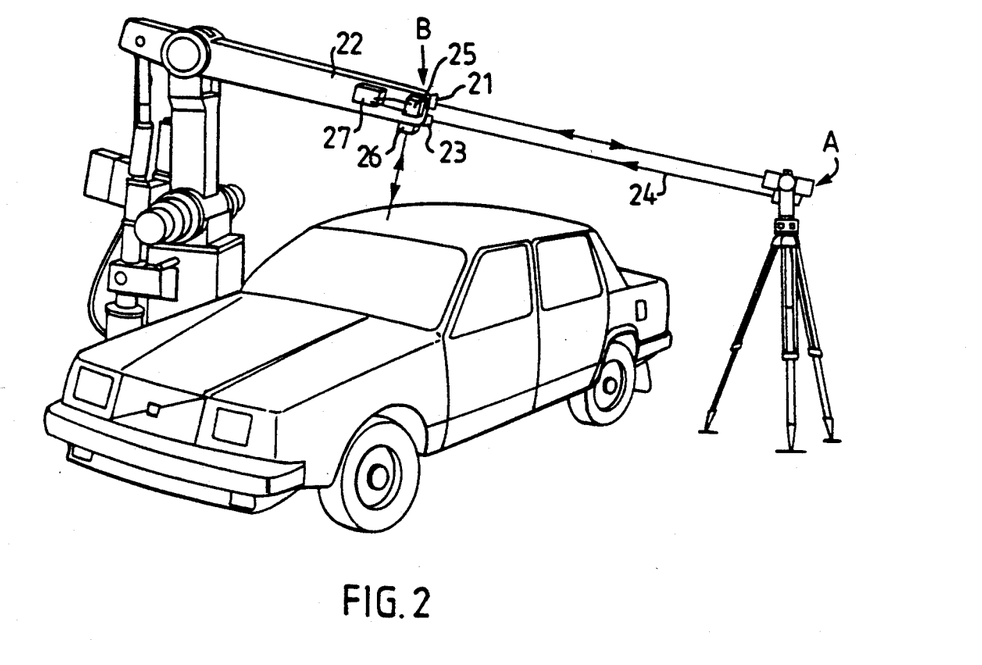
FIG. 2 illustrates a second embodiment of the inventive arrangement, adapted for determining the external measurements of a car.

FIG. 2 illustrates an embodiment of the invention used for determining the external measurements of a car body. It is difficult to define directly the positions of the various measuring points on a car body by direct reflection, i.e., without placing measuring prisms on the car body, from a main measuring station, since such position measuring methods suffer from the drawbacks that:

A. Reflection is low, due to the poor reflective properties of the surface being measured.

B. Reflection is uneven over the measuring surface, which makes it difficult to determine on which part of the measuring point a measurement is actually taken; this applies particularly to uneven surfaces and oblique incident measuring beams.

C. The range is poor in comparison with measuring with the aid, for instance, of glass prisms.

The aforesaid drawbacks are particularly applicable when establishing the measurements of large objects and when very accurate measurements are desired.

One way of eliminating the aforesaid problems is to divide the measuring process into two measuring processes:

1. A process which uses a main measuring system A which measures the positions of a prism 21 or a system of prisms fixedly mounted on a robot arm 22. The main measuring system is preferably a target tracking system, so that the system will be locked automatically onto the prism 21 and determine the position of the prism.

2. A second measuring system which is mounted on the robot arm and which comprises an angle-measuring device 23 of, for instance, the same type as the device referenced 4-8 in FIG. 1. This angle measuring device indicates the angle between the substantially collimated light beam 24 transmitted from the main measuring system A and the normal to the surface on which the unit 23 is mounted. Similar to the embodiment illustrated in FIG. 1, two vertical angle meters are provided, these meters being illustrated in the figure solely by a block 25. A distance meter 26 of the kind capable of automatically measuring the distance to the nearest surface is fixedly mounted on the underside of the robot arm 22, preferably in alignment with the line against which the angle is measured by the two vertical angle meters 25, although said distance meter may also be positioned at a preselected angle to said line. The block 27 represents the computer.

As will be understood, an EDM-type distance meter can also be used as the distance meter 26, although such a distance meter is unnecessarily expensive in the present context. Other, relatively inexpensive distance meters are to be found which can be used instead, particularly when the robot arm 22 is moved relatively close to the surface of the car body. In other respects, the robot arm is guided so that the distance meter 26 will measure as near as possible at right angles to the car body. One distance meter which will measure short distances with high precision is a so-called OPTICATOR, with which a transmitted laser beam, subsequent to reflection from the measuring surface, is permitted to impinge on a SITEC-detector, subsequent to having passed through a lens system. For the sake of illustration, the robot arm 22 is shown positioned at a relatively long distance from the surface of the car body. When using an OPTICATOR, the robot arm is moved very close to the car body, e.g., at a distance from the body of from some centimeters to a decimeter. The result of the distance measuring process will then lie within a tolerance of around one or two microns. Another type of distance meter 26 suitable for use in the present context is the interferometer distance meter described in International Patent Application PCT/SE89/00009. Other types of distance meter can also be used, for instance acoustic type meters. One essential criterion of the distance meter used is that it is capable of measuring short distances accurately.

The robot may be of extremely simple and inexpensive construction and need not be accurate, and may even be permitted to shake, for instance the type of robot arm used for painting work or like work, since the measuring accuracy required is achieved with the inventive measuring arrangement. The robot arm 22 carrying the part B of the inventive measuring arrangement is passed over the object to be measured, i.e., the car body, in accordance with a programmed movement pattern which provides automatic scanning with high measuring precision, since the main system constantly measures against the prism 21.

Figure 3:
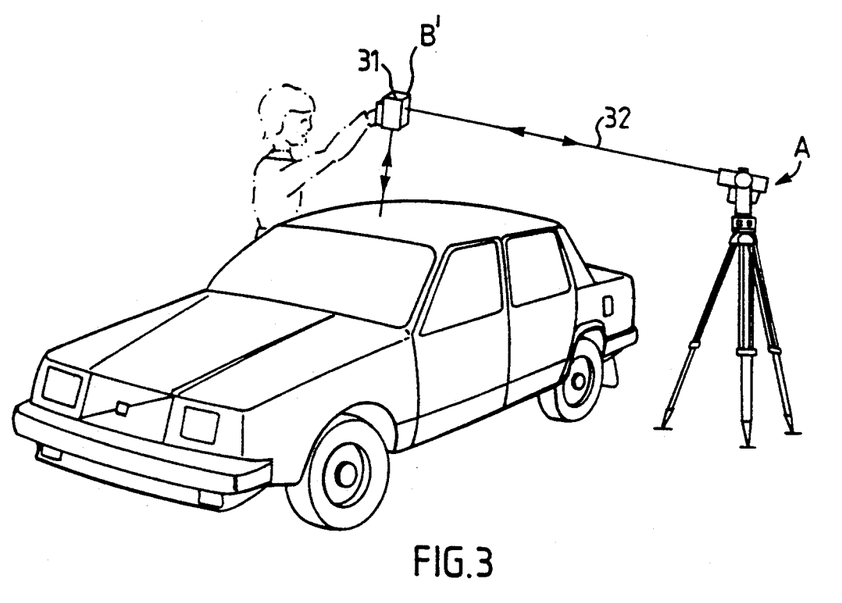
FIG. 3 illustrates a variant of the embodiment illustrated in FIG. 2.

Neither need the part B' of the measuring arrangement be carried by a robot arm, and the arrangement may, instead, be mounted in a box 31 held and moved manually by a workman (FIG. 3). This embodiment also includes a facility in which the distance measuring beam 32 of the instrument A is also used for measuring angular deviations, which is effected with the aid of a substantially coaxial arrangement, i.e., the prism 3 and the lens system 4,5,6 (FIG. 1) are not positioned at an optical distance from one another. Coaxial arrangements are relatively common within optics (see for instance U.S. Pat. No. 4,712,915), and consequently no separate figure illustrating such an arrangement has been included in the present drawings. For instance, the arrangement may comprise a beam splitter positioned in the beam path forwardly of the optical system, the beam splitter being operative to direct a part of the incident light beam onto the prism 3 and a further part onto the lens system 4,5,6, these optical units naturally being positioned to receive light from the beam splitter.

Alternatively, the beam splitter may be replaced with a mirror of small area which is positioned obliquely and centrally in the beam path and which will direct the central part of the incident light beam onto either the prism 3 or the lens system 4,5,6 (which is then directed towards the mirror and not straight forward as in the FIG. 1 illustration).

Shaking is difficult to avoid when the part B' is handheld. In actual fact, the shaking that takes place is much more pronounced than the shaking experienced with even the simplest robot, and consequently compensation must be made for the shaking that takes place. This can be effected in a conventional manner, with the aid of a so-called TN-system (translation normalizing system) (illustrated schematically in the form of a broken-line block 33 in FIG. 1). The system includes six accelerometers arranged in pairs and directionally opposed along each of the cartenian coordinates x, y, z, i.e., two accelerometers in each of the coordinate axes. The signals produced by the six accelerometers in the TN-system 33 are supplied to the computer 9, which compensates for shaking of the aforesaid part B' on each measuring occasion, on the basis of the signals.

Figure 4:
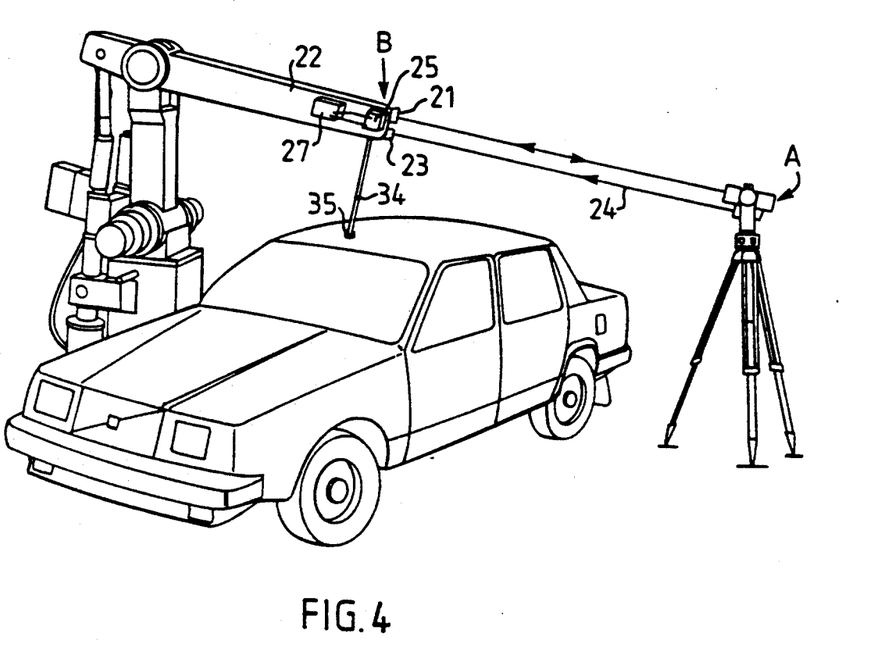
FIG. 4 illustrates a further variant of the embodiment illustrated in FIG. 2.

Measuring the external configuration of a large object, such as a car, need not necessarily be carried out without contact with the surfaces being measured. As shown in FIG. 4, in which components similar to those illustrated in FIG. 2 are identified with like reference signs, the distance meter 26 can be replaced, to this end, with a fixed staff 34, having a length 10 cm for instance, and having a measuring tip in the form of a small ball 35. The staff mounting device may be provided with an arrangement (not shown) for detecting when the ball 35 is in contact with the object, e.g., the car, to be measured.

Figure 5:
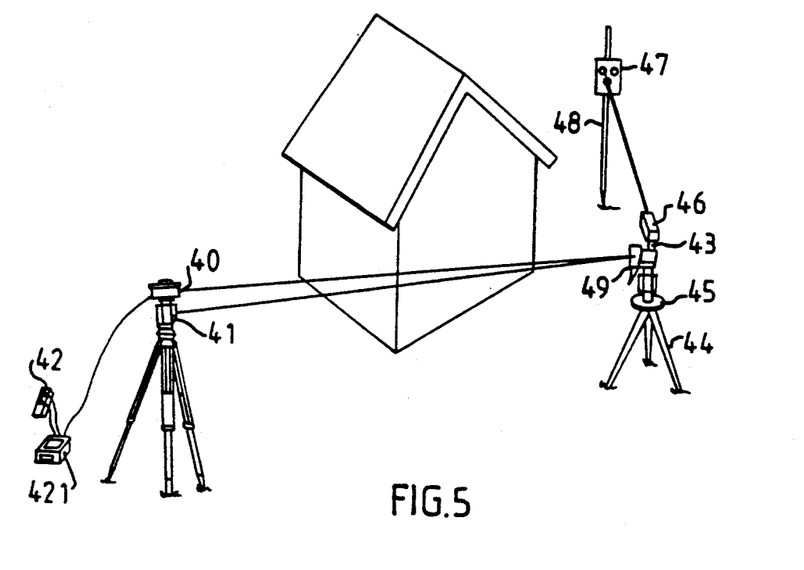
FIG. 5 is a schematic illustration of a measuring process carried out with the aid of one embodiment of an inventive intermediate station.

FIG. 5 illustrates an embodiment in which a main station equipped with a distance meter 40 is positioned centrally. The main station also includes a unit 41 which aligns itself with a reflex from a point on which a measurement is to be taken, and follows the reflex as it moves. To this end, the unit 41 is provided with servo motors which rotate the distance meter into true alignment, in both the horizontal and the vertical direction. The exact construction of this main station has no relevance in the present document and forms no part of the inventive concept. One embodiment of a station of this kind is described in the coterminous Swedish Patent Application No. 8901221-5. However, the motors require space and additional power supply, illustrated by a battery 42, and also require the provision of a relatively bulky calculating or computing device 421, which causes the main station to be rather bulky and heavy, and consequently it is preferable to avoid having to move the station during the course of determining the position of measuring points in an area.

In order to enable the positions of measuring points concealed from the main station to be defined or established, the staff man is equipped with an intermediate station which includes a rod 43 provided with a tripod 44 at the bottom end thereof and an arrangement 45 by means of which the rod can be placed exactly vertical. Pivotally mounted on the top end of the rod is a distance meter 46 which is at least provided with a vertical-angle indicator or meter, so that it can be moved upwardly and downwardly into alignment with a target point 47, this target point in the FIG. 5 embodiment having the form of a reflector placed on a setting-out stick or staff 48 which is hidden from the view of the main station, behind a building.

The rod 43 carries a reflector 49 on which the main station aligns and carries out a measuring process. The position of the main station is known, as is also its direction of alignment in the horizontal and vertical direction. Furthermore, the distance to the intermediate station is measured by the distance meter 41.

The calculating unit 421 of the main station is then able to calculate the position of the intermediate station 43–46. The distance meter belonging to the intermediate station functions to measure the distance to the reflector 47 and the vertical angle of the distance meter, i.e., the angle at which the distance meter is inclined to the horizontal.

In order to determine the position of the measuring point 47 in a horizontal plane, the intermediate station, together with distance meter 41, is moved to a new position and a new measurement is taken on the reflector 47, the position of the reflector 47 then being calculated by triangulation. The prism 49 must be directed onto the main station 40,41. This can be achieved either by mounting the prism for pivotal movement about the rod 43, or by fixedly mounting the prism on the rod 43 and rotating the rod in a manner to bring the prism into alignment with the main station. In this latter case, the distance meter 46 is mounted for pivotal movement about the rod axis. This pivot mounting can be provided with an angle indicator operative to disclose the angle between the different angle positions of the reflector 49 and also the angle of the distance meter to the rod axis. This angle can be used to calculate the position of the reflector and therewith obviate the need to place the intermediate station in two different positions in order to determine the position of the prism. Instead, the intermediate station, together with its distance meter, may be provided with a horizontal angle indicator and a measurement can be taken on a reference point whose position is known, in addition to taking measurements on the prism 47. This reference point may conveniently be one of the other measuring points on which measurements have been made directly by the main station 40, 41. Alternatively, the main station may be provided with a reflector (not shown) and used for reference measurement purposes. The position of the measuring point can then be calculated by combining the measuring results obtained from both the main station and the unit of the intermediate station, with the aid of a calculating program based on the simple geometrical relationships which prevail through the measuring lay-out. These relationships are well known to those skilled in this art, as is also the configuration of appropriate software, and consequently need not be described in detail here.

Figure 6:
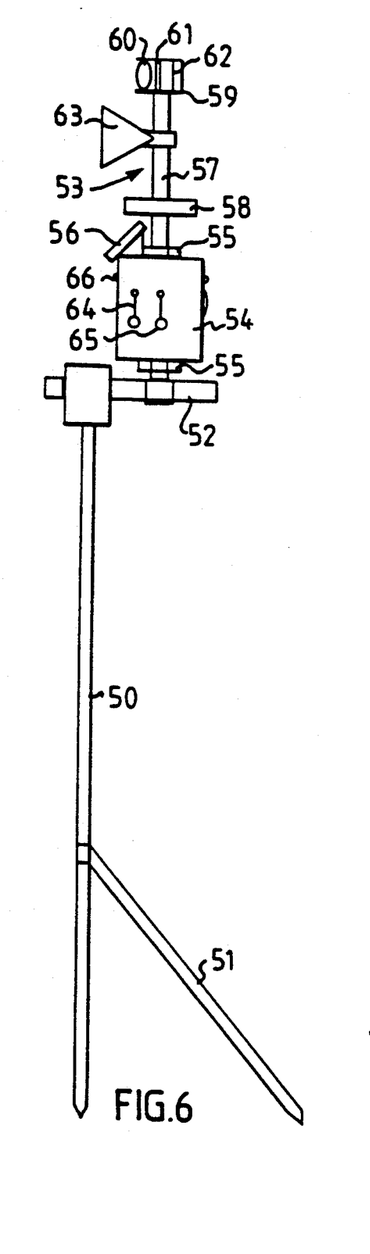
FIG. 6 illustrates another embodiment of the inventive intermediate station.

FIG. 6 illustrates another embodiment of an inventive intermediate station. In the case of this embodiment the staff used may be a so-called Jacobs-staff provided with a supporting leg 51. Mounted on the top of the staff is a fixed frame 52 on which a rod-like unit 53 is rigidly mounted. This unit includes a distance meter 54, preferably an EDM-type meter (EDM=Electric Distance Meter) which is operative to measure target distances in straight lines, with the aid of modulated light. The distance meter is preferably of the kind which measures with direct reflex, i.e., measures directly on a target point without needing to be provided with a separate reflector. The distance meter 54 can be pivoted in relation to the rod-like unit 53 by means of a pivot arrangement 55 provided with an exact rotary-angle sensor. The distance meter 54 is provided with electronics and a display 56.

Mounted above the distance meter 54 on the rod 57 is a device which indicates the direction towards a main distance-measuring station (not shown) and which automatically follows the station illustrated in FIG. 6, this direction indicator either being a telescope 58 or an optical arrangement 59 comprising a lens 60, a filter 61 and a two-dimensional detector 62 essentially of the same kind as the elements 4–6 in FIG. 1. A cube corner prism 63 is mounted on the same staff 47 as the direction indicator and serves as the element on which the main distance-meter station is held automatically aligned and on which the station carries out its measuring processes.

As will be seen from FIG. 6, the two vertical angle indicators 64 and 65 of this embodiment, these indicators corresponding to elements 10 and 11 in FIG. 1A, are positioned in the distance meter 54. The distance meter 54 can also be rotated about an axis transversal to the rod 57, so as to enable the meter to be directed upwards or downwards.

In use, the operator first erects a main measuring station, which will preferably have the property of being able to automatically align itself with a target station provided with a prism and thereafter maintain this alignment and follow the movement of said target station. Such a main measuring station will be relatively large and heavy, and the work required to position the base of the station so as to ensure that the distance meter will be placed exactly horizontal is very exacting. The station illustrated in FIG. 6 can be carried relatively easily and can be readily erected on a site from which later measurements can be made on target points which cannot be sighted directly from the main measuring station. The operator places the staff 50 on the measuring site and directs the prism 63 on the staff towards the main measuring station, either by sighting through the telescope 58 or with the aid of information obtained from the sighting unit 59, and positions the supporting leg 51, so that the alignment will be kept substantially stable. The distance meter 54 is then directed onto a target point, by rotating the meter around the rod 57 and also around an axis perpendicular to the rod, while looking through the telescope 66 incorporated in the distance meter. The two vertical angle meters 64 and 65 now measure the vertical alignment of the distance meter. An exact measurement is also taken of the angular rotation of the distance meter relative to the rod. The software stored in the computer unit 56 may include algorithms which calculate the position of the unit 59 in relation to a junction point located in the distance meter adjacent its vertical-angle indicating devices 64,65, on the basis of the impact point on the two-dimensional detector 62 of the unit 59, the distance between the unit 59 and the distance meter 54 and the setting of the distance meter in relation to the rod 57.

Figure 7:
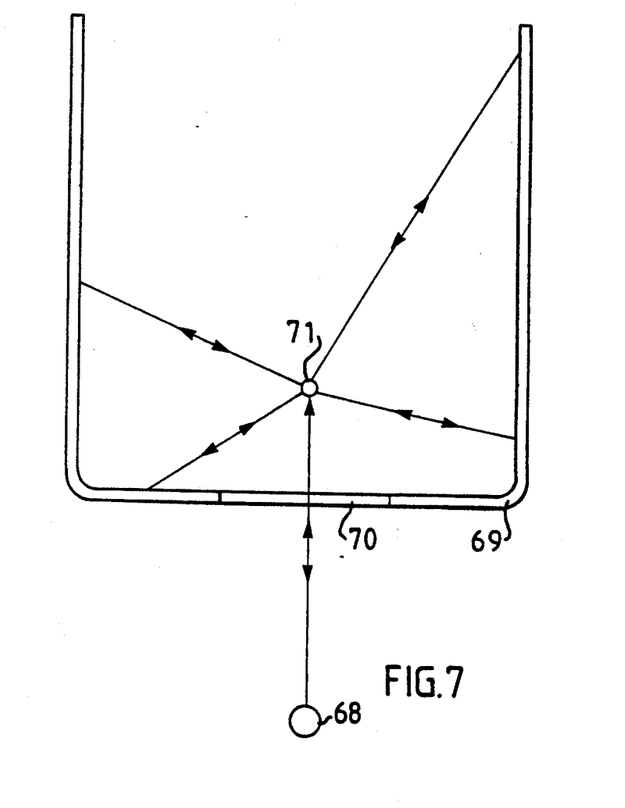
FIGS. 7 and 8 are schematic illustrations of two further measuring processes in which the intermediate station illustrated in FIG. 6 can be used.

FIG. 7 illustrates a first example of measuring procedure carried out with the use of the intermediate station illustrated in FIG. 5 or in FIG. 6. A main measuring station 68 is erected outside a building 69. An intermediate station 71 is positioned in one room in the building 69. The main measuring station 68 carries out a measuring process on the intermediate station 71, through an open window 70. The intermediate station 71 carries out a plurality of measurements within the room while holding the main measuring station 68 in alignment with the intermediate station and measuring-up the position of the prism on said intermediate station on each measuring occasion. It is difficult to hold the intermediate station illustrated in FIG. 6 stable. Nevertheless, this instability does not influence the measuring result, because the main measuring station 68 follows the movement of the intermediate station and because of the measuring arrangement provided in said intermediate station 71.

Figure 8:
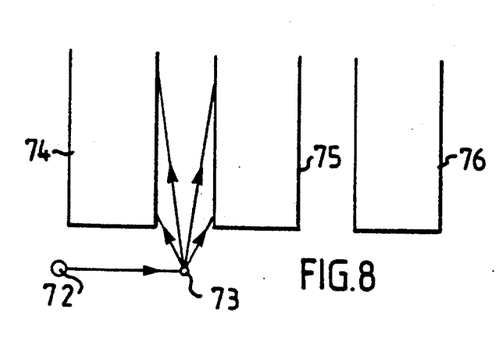

FIG. 8 illustrates another example of measuring procedure with the use of the inventive intermediate station, in this case the intermediate station illustrated in FIG. 6. A main measuring station 72 is erected in front of a row of buildings 76, with the station directed along the row of buildings. The intention is to determine exactly the positions of measuring points located between the buildings. An intermediate station 73 is carried by an operator along the row of buildings and placed in front of the passageways between adjacent buildings and carries out the intended measurements.

I claim:

1. An arrangement for establishing or defining measuring points which cannot be defined or established directly by a main station comprising distance measuring equipment which is operative to determine its own position and also the position of a position determining unit wherein
    (a) the position determining unit is mounted on an intermediate station unit which is provided with an indicating device which includes means for indicating the direct distance to the target point and the angle defined by said target-point direction and a horizontal plane, wherein the intermediate station unit can be placed in a position in which the main station is able to determine the position of the position-determining unit and in which the intermediate station can determine the position of the measuring point in relation to the position-determining unit;

(b) at least one of the main station and the intermediate station unit is provided with means for storing measurement data; and (c) an arrangement is provided for combining the measuring results obtained from the intermediate station unit and the position-determining data for the main system in order to provide positional data for each measuring point.

2. An arrangement according to claim 1, wherein the main station includes a distance measuring station having a length meter, a vertical angle meter and a horizontal angle meter, said distance measuring station preferably being of the auto-setting kind capable of following the movement of an auxiliary unit.

3. An arrangement according to claim 1, wherein the intermediate station unit includes:

(a) an angle-deviation measuring device which is operative to determine the angle between the path extending between the position-determining unit and the main measuring station and a normal to a plane sensitive to the angle-deviation measuring device;

(b) a vertical-angle indicating device which is operative to measure the angle position in relation to a vertical line in at least two mutually different directions for a part of the marking equipment having a known or measurable positional relationship with a sensitive plane of the angle-deviation measuring device;

(c) the distance indicating unit giving the distance to the measuring point in a determinable direction relative to the direction of said normal; and (d) a calculating unit which is operative to calculate the position of a junction point where the sensitive plane of the vertical-angle indicating device and a plane defining a given angle with said sensitive plane of said angle-deviation measuring device form an angle with one another on the basis of the sensed angles, the distance obtained from the distance indicating unit and the position of said unit in relation to said junction point and the position of the measuring point on the basis of the position of the junction point.

4. An arrangement according to claim 3, wherein the angle deviation measuring arrangement includes a detector device having an extensive area on which the impingement point of an incident light beam can be indicated, and a lens system which is operative to focus a light beam transmitted from the main measuring station onto the detector device.

5. An arrangement according to claim 3 or 4, wherein the vertical-angle indicating device includes two pendulum accelerometers or a double-pendulum accelerometer.

6. An arrangement according to any one of claims 1 to 4, wherein the distance indicating unit includes a staff.

7. An arrangement according to claim 6, including means for adjusting the staff to different lengths.

8. An arrangement according to any one of claims 1 to 3, wherein the distance indicating unit includes a distance meter.

9. An arrangement according to any one of claims 1 to 4, including a transmission arrangement transmitting information relating to the values measured by the main measuring station to the computing unit.

10. An arrangement according to any one of claims 1 to 4, wherein measurement data from all measuring arrangements and devices is stored in the memories in the main measuring station and the marking equipment for the purpose of making calculations in the computing unit on an occasion subsequent to the measuring occasion.

11. An arrangement according to any one of claims 1 to 4, wherein the marking equipment is mounted on a movable arm intended to be moved over a surface whose shape is to be measured.

12. An arrangement according to claim 11, wherein the movable arm is a robot arm.

13. An arrangement according to any one of claims 1 to 4, wherein the main measuring station is of the kind which will lock automatically into alignment with the measuring unit of the marking equipment.

14. An arrangement according to any one of claims 1 to 4, wherein the marking equipment is provided with a shake-compensating unit coupled to the computing unit such as to send to said unit signals by means of which the computing unit can effect electrically compensation of shaking of the marking unit during a measuring process.

15. An arrangement according to claim 3 or 4, wherein the distance indicating unit (54) can be selectively adjusted to determinable angular positions in relation to the direction of said normal.

* * * * *